United States Patent [19]

Hodsdon

[11] Patent Number: 4,621,373

[45] Date of Patent: Nov. 4, 1986

[54] CONTROL SURFACE FOR A TRUNKING PERSONAL RADIO

[75] Inventor: Roy F. Hodsdon, Lynchburg, Va.

[73] Assignee: General Electric Company, Lynchburg, Va.

[21] Appl. No.: 588,997

[22] Filed: Mar. 13, 1984

[51] Int. Cl.$^4$ .................. H04B 1/38; H04B 1/034; H04B 1/08

[52] U.S. Cl. .................................... 455/89; 455/90; 455/95; 455/128; 455/347; 455/351; 200/5 A; 361/398; D14/64; D14/68; D14/95; 379/63; 379/369

[58] Field of Search .................. 455/89, 90, 95, 128, 455/347, 351; 179/90 K, 103, 179, 2 CA; 200/5 E, 292, 5 A; 340/365 R, 365 S; 361/398, 399, 412–415, 422; D14/68, 70, 95, 63, 64

[56] References Cited

U.S. PATENT DOCUMENTS

| | | |
|---|---|---|
| 3,353,069 | 11/1967 | Slavin . |
| 3,760,137 | 9/1973 | Shimojo et al. ............... 200/5 A |
| 3,873,889 | 3/1975 | Leyba . |
| 3,909,564 | 9/1975 | Scheingold et al. ............ 200/5 E |
| 3,932,722 | 1/1976 | Obata et al. .................. 200/5 A |
| 3,959,610 | 5/1976 | Finnegan et al. .............. 200/5 A |
| 3,982,081 | 9/1976 | Demler, Jr. ................... 179/90 K |
| 4,101,871 | 7/1978 | Oliveira et al. ............... 179/90 K |
| 4,153,822 | 5/1979 | Ueda et al. ................... 179/103 |
| 4,178,488 | 12/1979 | Nishihata ...................... 179/103 |
| 4,225,970 | 9/1980 | Jaramillo et al. .............. 455/90 |
| 4,243,846 | 1/1981 | Lenaerts et al. .............. 179/90 K |
| 4,289,940 | 9/1981 | Sado et al. .................... 200/5 A |
| 4,291,202 | 9/1981 | Adams et al. .................. 179/103 |

OTHER PUBLICATIONS

IBM Technical Disclosure Bulletin, vol. 22, No. 8A, 1980, "Module Test Socket".
"The Kenwood TR-2400", by Schultz, 1/1981.
"FT290R Review", Radio & Electronics World, vol. 1, Iss. 2, Nov. 1980.

*Primary Examiner*—Jin F. Ng
*Attorney, Agent, or Firm*—Nixon & Vanderhye

[57] ABSTRACT

A control surface is positioned on the top horizontal surface of the case of a personal radio. A flexible printed circuit connects the control surface to the internal electronic circuits of the personal radio. A printed circuit board is connected to the flexible printed circuit by a connector soldered to both the flexible printed circuit and the printed circuit board. Some of a plurality of electrical pathways disposed on the printed circuit board are grouped into conductive pairs, while other pathways connect the conductive pairs to the connector. A keypad formed of a sheet of resilient material encases a surface of the printed circuit board. Molded into the keypad are resilient hollow keys, the hollow of each of which contains a conductive pad. When a key of the keypad is depressed, the conductive pad associated with that key makes contact with predetermined ones of the conductive pairs of the printed circuit board, completing an electrical circuit. The completed electrical circuit is detected by the electronic circuits of the personal radio and used to program the functions of the radio.

3 Claims, 3 Drawing Figures

CONTROL SURFACE FOR A TRUNKING PERSONAL RADIO

CROSS-REFERENCES TO RELATED APPLICATIONS

This application is related to my copending application entitled "ILLUMINATED COMPACT CONTROL SURFACE", U.S. appl. Ser. No. 589,000, filed on Mar. 13, 1984, which provides more detailed disclosure of the illuminated display device discussed in the present application.

FIELD OF THE INVENTION

The invention relates in general to the packaging of electronic devices. More specifically, the present invention provides a compact, high density control surface where mounting surface area is extremely limited. More particularly, the invention provides a control surface especially suited for use as a user interface to a personal radio transceiver. The invention may be advantageously used whenever a user interface of high durability, shock resistance, weather resistance and high control density per unit area is needed.

BACKGROUND OF THE INVENTION

As integrated circuit manufacturing technology has advanced, it has become possible to decrease the size of a wide variety of electronic devices. Great efforts have successfully been directed toward the miniaturization of telecommunication devices because of the advantages of making such devices easily portable. Portable radio transceivers can provide communication capabilities in a wide variety of circumstances where conventional landline communication is unavailable, impractical or inconvenient. Personal radio transceivers are used to establish communication links into areas of rugged terrain which are inaccessible by conventional telephone landlines, to provide constant, private communication between two or more individuals without the inconvenience of dialing and answering a telephone, and to provide communication capabilities to an individual who must communicate while moving (e.g. while walking or travelling in a moving vehicle) or while at fixed positions distant from conventional landline communication devices.

Personal radio transceiver components have recently become so miniaturized that a very complex transceiver having great communication and functional capabilities may be packaged in a case small enough to be easily carried in the hand or hung from a belt. The transceiver case can be made impact-resistant and waterproof so that the transceiver will function after rough treatment (such as dropping, bumping against objects, exposure to the elements, etc.). Personal transceivers of high reliability and durability are thus possible.

One of the limitations on the reliability and durability of personal radio tranceivers at present is the construction and design of the control surface (user interface). Early personal transceivers had relatively unsophisticated electronics and associated functions, and usually operated on only one or a small number of fixed, predetermined frequencies. The only user controls often provided on such early transceivers were simple power on/off and transmit/receive switches, a receiver volume control knob, and perhaps a switch or knob to select one of a small number of crystal-controlled operating frequencies.

As integrated circuit technology has advanced, the sophistication of the functional capabilities of personal transceivers has increased dramatically. Modern personal transceivers normally are capable of a wide variety of functions, such as fully programmable operating frequencies (within a band of frequencies), programmable semi-duplex frequency operation (whereby the receive frequency of the transceiver may be selectively offset a programmable frequency difference from the transmit frequency), selectable power output, receiver scanning capability (whereby the receiver automatically continuously searches a number of programmed frequencies or the frequency spectrum at programmable intervals between two programmable frequencies to locate active channels, and may either stop scanning when an active frequency is found, or continue scanning and store the active frequency in an internal memory for later reference), memory capabilities (whereby last-used frequencies of operation may be stored or whereby a random access memory may be programmed with a number of commonly-used frequencies to allow a user to choose the frequency of operation without having to reprogram the frequency in full each time it is to be used), tone encoding (whereby the transceiver can transmit a series of user-selected tones for accessing private receivers, for controlling devices interfaced with receivers, or for accessing standard TOUCH-TONE ® telephone lines through a base transceiver connected to a "phone patch"), selectable transmitter modulation modes and levels, etc.

As the functional capabilities of personal transceivers have increased, suitable interface devices for enabling a user to interact with highly complex transceivers to program the transceiver functions have become necessary. A suitable control interface must necessarily have a high control per unit area density because of the limited exterior surface area of the case of the personal transceiver. The interface must also be durable, shock-resistant, weather resistant and highly reliable under a variety of adverse conditions in order to withstand the rough treatment to which personal transceivers are subjected without degrading the reliability of the transceiver. The cases of personal transceivers conventionally are long, thin rectangular boxes (so that the transceiver can be easily held in the hand), where one of the ends of the box conventionally serves as a bottom upon which the transceiver may rest. It is desirable to position the entire user interface on the top end of the rectanglar transceiver case so that the controls are readily accessible when the transceiver is resting on its bottom, inserted into a leather or vinyl case hung from a belt, or temporarily housed in a battery charger or a "slide-mount"-type receptacle in a vehicle.

Matrix alphanumeric keyboards are especially suited for personal transceiver control interfaces because they provide high control density per unit area, are useful for programming a variety of different types of information, and are compatible with standard telephone TOUCH-TONE ® pad configurations. Moreover, much of the programming information needed to program a personal transceiver is numeric (or can be reduced to numerics). While conventional telephone-type TOUCH-TONE ® pads such as those disclosed by Adams et al (U.S. Pat. No. 4,291,202 issued Sept. 22, 1981), Demler et al (U.S. Pat. No. 3,982,081 issued Sept. 21, 1976), Scheingold et al (U.S. Pat. No. 3,909,564 issued Sept. 30, 1975) and Ueda et al (U.S. Pat. No. 4,153,822 issued May 8, 1979) provide high reliability and durability, they are much too large to be positioned on the top surface of conventional personal radio transceivers.

Such conventional TOUCH-TONE ® pads have been used in the past for device user control interfaces (including personal radio transceiver control surfaces) by mounting them on one of the elongated sides of the rectangular case of the device. For example, Ueda et al (mentioned above) discloses a TOUCH-TONE ® dial plate mounted on the back of a substantially rectangular telephone handset. See also Adams et al. However, this mounting position is undesirable for personal transceiver applications because it subjects the dial plate to accidental operation and possible damage from impact when the rectangular case is bumped into objects. Moreover, a personal radio tranceiver must be picked up and held in the hand or rested horizontally on its back (usually an inconvenient position because the transceiver antenna must normally be maintained in a vertical position since VHF transmissions are conventionally vertically-polarized) in order to operate a control surface so positioned. A control surface mounted on a side surface of a personal radio transceiver is also difficult or impossible to operate when the transceiver is hung from a belt, and "slide-mount"-type receptacles must be adapted to provide openings or spaces to accommodate a control surface so positioned.

Even if known TOUCH-TONE ® pads could be sufficiently minaturized to be mounted on the top end of the rectangular personal transceiver case, they would not be sufficiently weather-resistant to avoid degradation of transceiver reliability. Moreover, a highly reliable way of connecting the TOUCH-TONE pad to the remainder of the transceiver electronics while providing for easy assembly and disassembly, mechanical shock isolation, and rf shielding would be necessary.

BRIEF SUMMARY OF THE INVENTION

A control surface for a personal radio transceiver in accordance with the presently preferred exemplary embodiment of the present invention is positioned on the top, horizontal surface of an elongated rectangular transceiver case. A flexible printed circuit connects the control surface to the internal electronics of the transceiver. A double-sided printed circuit (PC) board is connected to the flexible printed circuit board by a plurality of rigid, cylindrical connectors of conventional design which are soldered to both the flexible printed circuit and the rigid PC board.

A plurality of electrical pathways disposed on the rigid PC board conduct electrical signals. Some of the pathways on the PC board are grouped into conductive pairs. Each member of a given conductive pair is formed into the shape of the letter "E". The legs of the "E" of one member of each pair are meshed with those of the other member of the pair without electrically connecting the two members of the pair. Pathways of conventional design connect each member of the pair to predetermined ones of the cylindrical connectors (and therefore to electronic circuits in the transceiver via the flexible printed circuit).

A keypad formed of molded silicone rubber encases a surface of the PC board. Plural resilient hollow keys (one in registration with each conductive pair disposed on the PC board) are molded into the keypad. A circular, conductive carbon silicone pad is disposed within the hollow of each of the keys. A plastic, shock-resistant bezel having openings in registration with each of the keys is disposed on the keypad and fixed to the transceiver case.

When a key of the keypad is depressed, the carbon silicone pad disposed in the hollow of the key makes contact with the meshed "E"s of the members of the conductive pair in registration with the depressed key, completing an electrical circuit between the members of the pair which is detected by the electronics of the transceiver. When the key is released, the resilience of the silicone rubber composition of the keypad forces the key to spring back to its original position, thus breaking electrical contact.

The keypad is waterproof and provides a weather resistant and impact resistant seal for the PC board. Because the keypad is very resilient, keys may be operated repetitively without wearing out and are impossible to break off. High reliability and durability of the control surface is thus assured, increasing the overall reliability of the transceiver.

These and other objects and advantages of the invention can be better appreciated by studying the following detailed description of the presently preferred exemplary embodiment in conjunction with the accompanying drawings.

DETAILED DESCRIPTION OF THE PREFERRED EMBODIMENT

Figure 1:
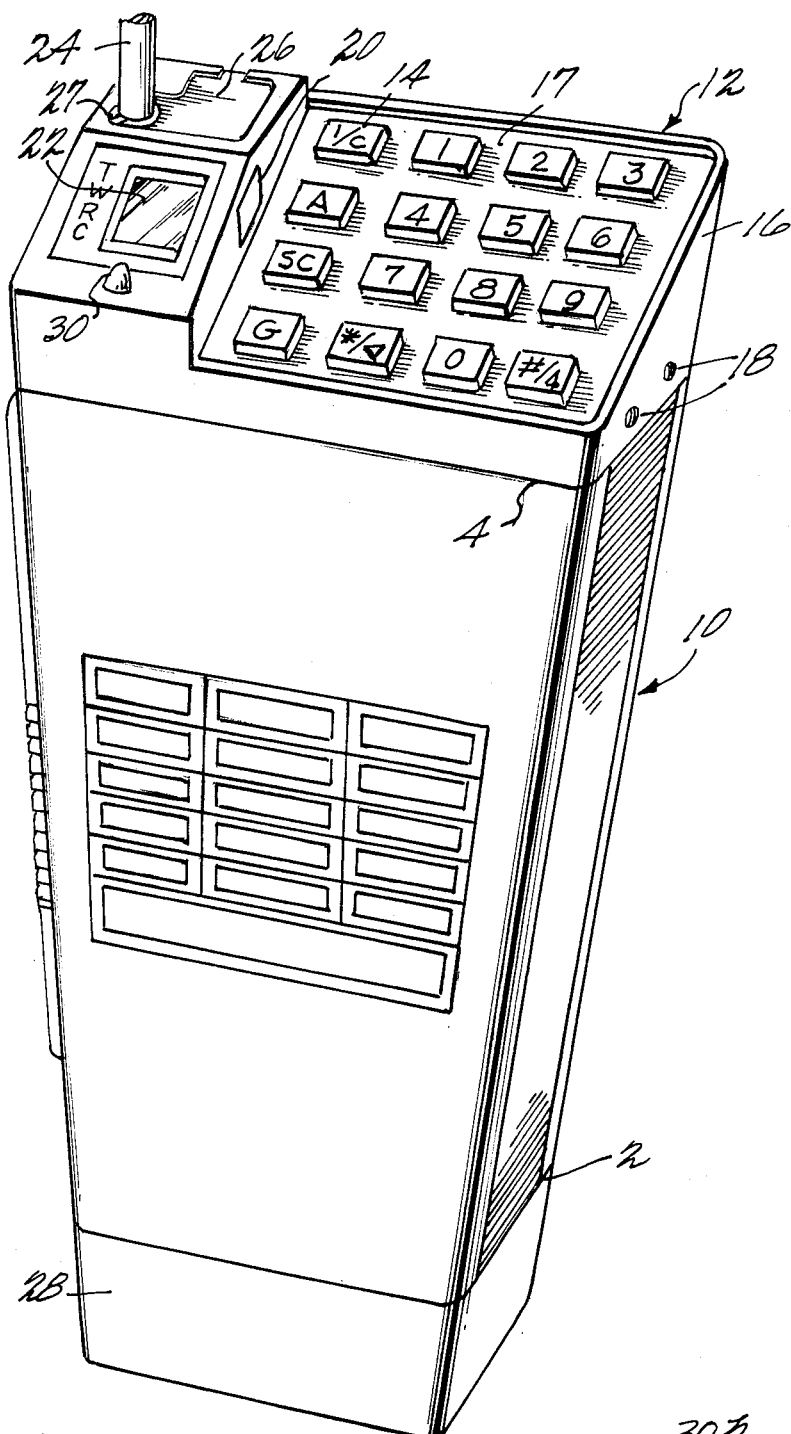
FIG. 1 is a perspective view of a personal radio transceiver utilizing a presently preferred exemplary embodiment of the present invention.

Referring to FIG. 1, the exterior of personal radio transceiver, referred to generally by reference numeral 10, is shaped in the form of an elongated rectangular box having four sides of surface area substantially greater than the surface area of the remaining two sides. One of the sides 2 of transceiver 10 with a smaller surface area serves as a bottom upon which the transceiver may rest. A control surface 12 in accordance with the presently preferred embodiment of the present invention is mounted on the remaining side 4 of transceiver 10 having a smaller surface area (the "top"). A bezel 16, suitably composed of impact-resistant, metallized plastic, has a sloping flat surface 17 from which a plurality of keys 14 (suitably sixteen in number) protrude. Bezel 16 may be fixedly attached to plate 78 by engaging screws 18 with three square nuts 79 located in plate 78 (shown in FIG. 2).

Each of keys 14 has imprinted upon it a visible numeric or symbolic label to indicate a unique function. Keys 14 are used to program information into transceiver 10. An illuminating lamp assembly 20 shines light onto keys 14 so that the keys are illuminated even under low ambient light conditions. A two-digit, seven-segment alphanumeric liquid crystal display (LCD) 22 displays information about the operation of the transceiver (for example, LCD 22 may display indicia of channel of operation).

An antenna 24 is removably mounted to control surface 12. Antenna 24 (which is electrically resonant at the band of frequencies for which transceiver 10 is designed to operate) receives and radiates rf signals. A removable plastic connector cover 26 is retained in position by a threaded antenna nut 27. Plastic connector cover 26 may be removed to access a programming connector 34 (shown in FIG. 2).

A battery power module 28, which may suitably be attached to the bottom 2 of transceiver 10, provides power to the transceiver. An indicator lamp assembly 30 on control surface 12 is used to provide additional information to a user about the status of transceiver operation (suitably whether the transceiver is in the transmitting mode).

Figure 2:
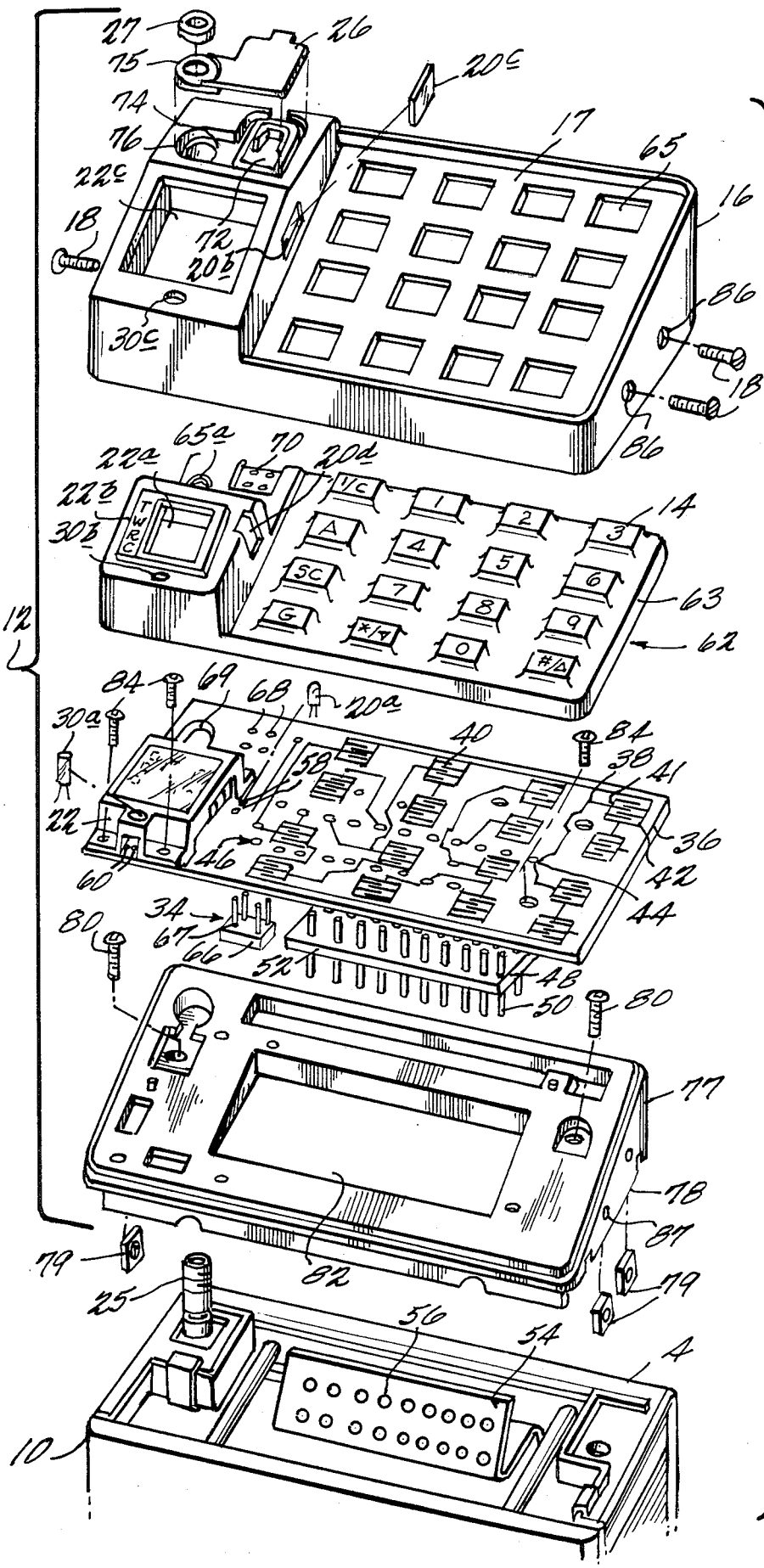
FIG. 2 is an exploded perspective view of the presently preferred exemplary embodiment shown in FIG. 1.

Referring to FIG. 2, electrical control signals produced by control surface 12 are generated on printed circuit (PC) board 36. PC board 36 is suitably a conventional nonconductive sheet of rigid material (suitably laminated epoxy fiberglass). Conventional conductive pathways 38 (suitably composed of copper covered by a thin coating of gold plate) adhere to both sides of PC board 36. Adhering to one side of PC board 36 is a plurality (suitably sixteen in number) of conductive pairs 40, each of said pairs comprising a conductive pair member 41 and 42. Conductive pair members 41 and 42 are suitably shaped in the form of the letter "E". The legs of the "E" shape of pair member 41 meshes with those of pair member 42 without electrically connecting the two pair members.

Conductive pathways 38 connect predetermined ones of conductive pair members 41 and 42 to predetermined ones of plated-through holes 44 (of conventional design). Plated-through holes 44 may suitably be formed into two straight rows 46 each comprising ten plated-through holes 44.

A flexible printed circuit 54 of conventional design extends from transceiver 10. Flexible printed circuit 54 connects control surface 12 to the internal electronic circuits (not shown) of transceiver 10. The electronic circuitry (not shown) of transceiver 10 is connected to flexible printed circuit 54 by conventional means (for example, some of the components of transceiver 10 may be mechanically mounted and electrically connected directly to flexible printed circuit 54, while other components may be mounted elsewhere and electrically connected to the flexible printed circuit by additional conductors such as copper wires). Because of the flexibility of printed circuit 54, control surface 12 can be moved a limited distance with respect to transceiver 10 while the control surface is being assembled to the transceiver and tested without severing the electrical connections between the control surface and the transceiver. Moreover, the flexibility of printed circuit 54 isolates the internal electronics of transceiver 10 from any mechanical shock to control surface 12 and vice versa.

Plated-through holes 56 are formed on flexible printed circuit 54 in a pattern preferably identical to and in registration with the pattern defined by plated-through holes 44 of PC board 36. A connector 48 of conventional design comprising cylindrical tin-plated conductors 50 (suitably 20 in number electrically and physically isolated from one another by a spacer 52) electrically connects PC board 36 to printed circuit 54. One end of each of conductors 50 is soldered to plated-through holes 56 of flexible printed circuit 54, while the other end of each of the conductors is soldered to plated-through holes 44 of circuit board 36. PC board 36 is thus electrically connected to transceiver 10 via conductors 50 and flexible PC board 54.

Also integral to PC board 36 is a two-digit, seven-segment alphanumeric liquid crystal display (LCD) 22 of conventional design. LCD 22 may be mechanically mounted to PC board 36 by screws 56, and electrically connected to the PC board by conventional leads and solder connections (not shown). The leads of a conventional miniature incandescent lamp 20a are plugged into a conventional socket, which is soldered to plated-through holes 58 on PC board 36. The leads of a conventional light emitting diode (LED) 30a is plugged into a second conventional socket, which is soldered to plated-through holes 60 on PC board 36. Lamp 20a provides illumination to keys 14, while lamp 30a provides information to the user about the status of operation of transceiver 10 (for instance, lamp 30a may light when the transceiver is in the transmit mode). Lamps 20a and 30a and LCD driver 22 are electrically connected to transceiver 10 via conventional conductive pathways 38, connector 48 and printed circuit 54.

Figure 3:
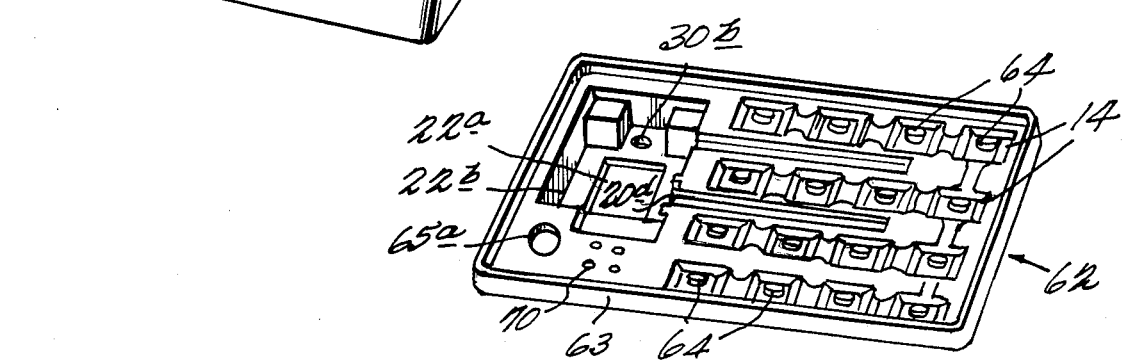
FIG. 3 is a bottom plan view of the keypad of the presently preferred exemplary embodiment shown in FIG. 1.

Referring to FIGS. 2 and 3, a keypad 62 suitably composed of a sheet of molded charcoal-gray silicone rubber defining four outer edges 63 encases a surface of PC board 36. Hollow protrusions molded into keypad 62 (suitably substantially square in shape and sixteen in number) form keys 14. A unique number or symbol (suitably from the set of numerals 0–9, and symbols "1/C", "A", "SC", "G", */▽" and "#/△") is imprinted on each of keys 14 in indelible white writing. Thus, each of keys 14 is dedicated to one or more predetermined unique functions to enable a user to selectively program functions into transceiver 10.

Because of the high resiliency of the silicon rubber composition of keypad 62, keys 14 deform when depressed and resume their original shape when released. A circular conductive carbon silicone pad 64 is molded within the hollow formed within each of keys 14. Keypad 62 is disposed on PC board 36 so that one of carbon pads 64 is in registration with each conductive pair 40. When one of keys 14 is depressed, the carbon pad 64 disposed within that key makes contact with both of members 41 and 42 of the conductive pair 40 associated with the key. Because carbon pad 64 is itself conductive, an electric current flows between member 41 and member 42 of the pair 40 through the carbon pad, completing an electrical circuit. The resulting electric current travels to transceiver 10 through conductors 38, connector 48 and flexible printed circuit 54, where it is detected and used to control the functions of transceiver 10.

When key 14 is released, the resilience of the silicone rubber composition of keypad 62 causes carbon pad 64 to spring back away from conductive pair 40, breaking the circuit. Other keys 14 may be depressed to further program transceiver 10. The thickness of the silicone rubber composition of keypad 62 and the dimensions of each of keys 14 are selected to provide sufficient resistance to depressing of keys by a user to provide positive tactile sensations when pad 64 electrically connects members 41 and 42 of its associated conductive pair 40, to reduce "bouncing" of the pad when it strikes the conductive pair members, and to provide suitable durability and puncture-resistance of the keys.

Referring again to FIG. 2, a substantially square hole 22a and a surrounding raised bezel 22b is molded into keypad 62. Hole 22a is large enough to expose the alphanumeric display segments of LCD 22. A substantially square illuminating hole 20*d* is molded into keypad 62 to allow light generated by lamp 20*a* to shine onto keys 14. A round hole 30*b* is molded into keypad 62 to allow light generated by LED 30*a* to escape.

Bezel 16 is disposed on keypad 62. The surface of bezel 16 facing keypad 14 is metallized to prevent rf radiation from escaping from transceiver 10 and radiation from the antenna from entering the keypad and the transceiver. Holes 65 (suitably rectangular in shape) in registration with keys 14 are defined by slanting surface 17 of bezel 16 (one hole 65 for each of keys 14) to expose the keys when the bezel is in position. A substantially square hole 22*c* is disposed in bezel 16 large enough to permit LCD bezel 22*b* to protrude through it. A hole 30*c* is disposed in bezel 16 in registration with hole 30*b* of keypad 62 to allow a user to see light generated by lamp 30*a*. A hole 20*b* in registration with hole 20*d* of keypad 62 is disposed in bezel 16. A translucent plastic lens 20*c* is fixed to the edges of hole 20*b* (suitably by water-impervious epoxy cement). Light from lamp 20*a* may shine through holes 20*d* and 20*b* and lens 20*c* to illuminate keys 14, permitting a user to visually distinguish the keys and their associated symbols even under low ambient light conditions.

Programming connector 34 (of conventional design) comprises cylindrical conductors 67 (suitably four in number) separated by a spacer 66. Conductors 67 are soldered to plated-through holes 68 in PC board 36. Holes 70 molded into keypad 62 in registration with conductors 67 allow the conductors to protrude through and remained sealed by keypad 62 when the keypad is positioned to encase PC board 36. A substantially square hole 72 cut into bezel 16 allows a user to orient and access programming connector 34 through the bezel. An indentation 74 is disposed in bezel 16 surrounding hole 72 to accommodate connector cover 26 (which also defines a round hole 75). Also disposed within indentation 74 is a round hole 76 to allow an antenna mounting stud 25 to protrude from control surface 12. To access programming connector 34, it is necessary only to unscrew antenna 24 (not shown) and antenna nut 27 and slide connector cover 26 over antenna stud 25 and away from control surface 12.

To assemble control surface 12 to transceiver 10, a plate 78 is first attached to the top surface 4 of the transceiver by screws 80 (suitably two in number). Plate 78 is metallized (suitably on side surfaces of the plate) to prevent electromagnetic radiation from escaping from transceiver 10 through control surface 12, to prevent radiation from antenna 24 from entering transceiver 10, and to isolate PC board 36 from such radiation (which could induce spurious currents to flow on the PC board). Connector 48 is soldered first to PC board 36, and then to flexible printed circuit 54 (which protrudes through plate 78 through a rectangular hole 82). PC board 36 is fixed to plate 78 by screws 84 (suitably 5 in number). Keypad 62 is then disposed on PC board 36 to encase the PC board. The outer edges 63 of keypad 62 snugly fit around the edges of PC board 36, thereby isolating the PC board from mechanical shock and providing weatherproofing. Because keypad 62 is weatherproof, PC board 36 is well protected from the elements. Keypad 62 also provides a weather proof and shockproof seal to LCD 22 and programming connector 34.

Next, bezel 16 is disposed over keypad 62 so that keys 14 protrude through holes 65, LCD bezel 22*b* protrudes through hole 22*c*, and antenna mounting stud 25 protrudes through a hole 81 in plate 78, a hole 69 in PC board 36, a hole 65*a* in keypad 62, and hole 76 in bezel 16. Screws 18 (suitably 3 in number) are inserted through holes 86 in bezel 16 and into square metal captive nuts 79 located in plate 78 to fasten the bezel to the plate. Connector cover 26 is slid over antenna mounting stud 25, positioned into depression 74 and secured in place by engaging threaded antenna nut 27 with the antenna stud. Finally, antenna 24 (not shown) is engaged with antenna mounting stud 25.

Assembly of control surface 12 is quick and simple. All operative components may be separately constructed and tested before final assembly, and may be easily replaced in the field using only conventional soldering equipment and an assortment of screwdrivers. The components are all firmly anchored to prevent damage from mechanical impact. Finally, keypad 62 provides a protective cover for the electronic circuitry and components of PC board 36 and transceiver 10, protecting them against a variety of adverse conditions including but not limited to water and mechanical shock.

While the invention has been described in connection with what is presently to be considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What is claimed is:

1. In a personal communications device of the type including: (a) a case comprising an elongated box having a top surface, a bottom surface and plural side surfaces, the length of at least one edge of each of said side surfaces exceeding the length of any of the edges of said top and said bottom surfaces, and (b) electronic circuit means, disposed within said case, for establishing communications with a further physically-distinct communications device in accordance with control signals applied thereto, an improvement comprising:

control surface means, disposed on said top surface and electrically coupled to said circuit means, for applying said control signals to said circuit means in response to manipulation thereof by a user, said control surface means including an array of depressable keys; said control surface means including a printed circuit board mounted to said case and including a plurality of electrical pathway means disposed on at least a first surface of said printed circuit board for carrying a plurality of respective electrical signals;

connector means operatively connected to said printed circuit board for electrically connecting with said plurality of electrical pathway means;

keypad means, disposed on said printed circuit board and at least in part defining said top surface, for causing current to flow through selected ones of said plurality of electrical pathway means, said keypad means including a sheet of nonconductive, resilient material encasing said first surface of said printed circuit board, said sheet defining a plurality of resilient, depressible molded hollow protrusions, each of said protrusions defining a corresponding hollow; and plural electrical contact means, one fixedly disposed within each of said hollows, for electrically connecting predetermined ones of said electrical pathway means together when an associated one of said protusions is depressed;

flexible printed circuit means for electrically connecting said connector means with said electronic circuit means;

said control surface means further including bezel means disposed on said keypad means for protecting said sheet and said printed circuit board, said bezel means having a substantially flat, inclined exterior surface including means defining a plurality of openings in registry with said protrusions, said inclined exterior surface at least in part defining said top surface.

2. A personal communication device as in claim 1 wherein at least one surface of said bezel means is metallized to provide electromagnetic radiation shielding.

3. A personal radio communication device comprising:

a hollow rectangular case including first and third side walls parallel to one another, second and fourth side walls parallel to one another, said first wall being rigidly joined to said second and fourth walls, said third wall being ridigly joined to said second and fourth walls, a bottom wall joined at a bottom end of said case to each of said first through fourth side walls, edges of each of said first through fourth side walls together defining a substantially rectangular opening at a top end of said case opposite said bottom end thereof;

electronic circuit means disposed in said hollow case for establishing communications with a remotely-located communications device; and a keypad assembly including an array of discrete keys electrically coupled to said electronic circuit means, mounted to said top end of said case within and obstructing said rectangular opening;

said keypad assembly including a metallized mounting plate, mounted to said top end of said case and obstructing said rectangular opening, including means defining a mounting surface inclined at an acute angle with respect to said bottom wall and further including means defining an opening through said mounting surface;

a printed circuit board, disposed on said mounting plate mounting surface, including means defining a plurality of electrical pathways on a first surface thereof;

a sheet of flexible material, disposed on said printed circuit board first surface, including means defining said array of keys, each of said keys including conductor means for selectively connecting predetermined ones of said pathways together;

bezel means, mounted to said top end of said case, including means defining an exterior surface oriented parallel to said mounting plate mounting surface and further including means defining an array of apertures in registry with said array of keys; and flexible printed circuit means, electrically connected at one end thereof to said printed circuit board and diposed through said opening defined in said mounting plate, for electrically coupling said printed circuit board to said electronic circuit means.

* * * * *